No. 718,315. PATENTED JAN. 13, 1903.
C. P. COTTRELL.
MACHINERY FOR CUTTING AND PADDING PAPER OR OTHER MATERIALS.
APPLICATION FILED MAY 22, 1902.
NO MODEL. 8 SHEETS—SHEET 3.

No. 718,315. PATENTED JAN. 13, 1903.
C. P. COTTRELL.
MACHINERY FOR CUTTING AND PADDING PAPER OR OTHER MATERIALS.
APPLICATION FILED MAY 22, 1902.
NO MODEL. 8 SHEETS—SHEET 6.

No. 718,315. PATENTED JAN. 13, 1903.
C. P. COTTRELL.
MACHINERY FOR CUTTING AND PADDING PAPER OR OTHER MATERIALS.
APPLICATION FILED MAY 22, 1902.
NO MODEL. 8 SHEETS—SHEET 7.

No. 718,315. PATENTED JAN. 13, 1903.
C. P. COTTRELL.
MACHINERY FOR CUTTING AND PADDING PAPER OR OTHER MATERIALS.
APPLICATION FILED MAY 22, 1902.
NO MODEL. 8 SHEETS—SHEET 8.

UNITED STATES PATENT OFFICE.

CHARLES P. COTTRELL, OF WESTERLY, RHODE ISLAND, ASSIGNOR TO C. B. COTTRELL & SONS COMPANY, OF NEW YORK, N. Y., AND STONINGTON, CONNECTICUT, A CORPORATION OF NEW JERSEY.

MACHINERY FOR CUTTING AND PADDING PAPER OR OTHER MATERIALS.

SPECIFICATION forming part of Letters Patent No. 718,315, dated January 13, 1903.

Application filed May 22, 1902. Serial No. 108,511. (No model.)

*To all whom it may concern:*

Be it known that I, CHARLES P. COTTRELL, a citizen of the United States, and a resident of Westerly, in the county of Washington and State of Rhode Island, have invented a new and useful Improvement in Machinery for Cutting and Padding Paper or other Materials, of which the following is a specification.

A machine embodying my invention in its entirety cuts from a web sheets which are perforated for tearing in lines parallel with and at suitable distances from the cut edges and piles on one and the other alternately of two receiving-tables a sufficient number of such perforated and cut sheets to form a pad, the completion of which is effected by stapling its sheets together between the lines of their perforations and their nearest cut edges. In such a machine while a pile is being formed on one table the pile previously formed on the other table undergoes the stapling process, so that there is no intermission in the operation of the machine. Certain features of my invention are, however, not limited to such a machine as is hereinabove mentioned, which may be termed a "duplex padding-machine," but are applicable generally to machines for cutting a web into sheets and depositing the so-cut sheets in piles.

I will first describe my invention, with reference to the accompanying drawings, as embodied in what I have hereinabove termed a "duplex padding-machine" and will afterward point out its novelty in claims.

Figure 1 is a face view of one of the pads to be formed by the invention; Fig. 2, a side elevation of the machine. Figs. 2ª and 2ᵇ are detail views corresponding with Fig. 2. Fig. 3*, a side view of gearing for driving the perforators and feed-rollers; Fig. 4*, a plan of part of the mechanism for driving the staplers; Fig. 6*, a partly-sectional plan view of some details imperfectly illustrated in Fig. 6; Fig. 7*, a detail corresponding with Fig. 7; Figs. 1 to 6 and Figs. 13 to 19 are on one scale, and Figs. 7 to 12 are on one scale, larger than that of Figs. 1 to 6.

Figures 1, 2, 2A, 2B:
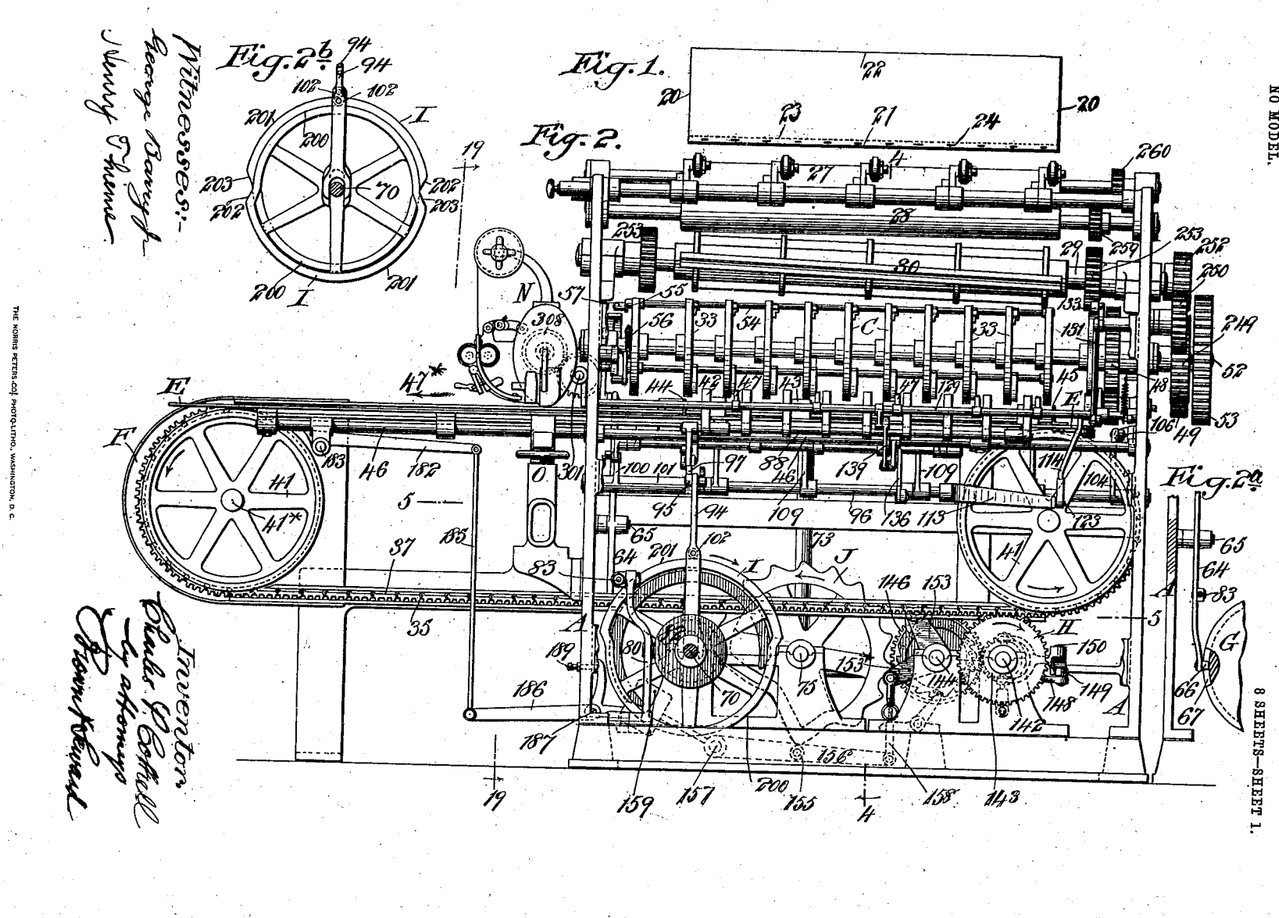

To render it more easy to understand my description of the construction and operation of the machine, I will first describe, with reference to Fig. 1, the stapled pad which is its product. In that figure the lines 20 represent the sides which correspond with the edges of the web from which the padded sheets have been cut, the lines 21 22 represent the edges formed by cutting the web transversely, the dotted line 23 represents the line of perforations for tearing the sheets from the pad, and 24 represents the staples inserted between 21 23.

I will now proceed with the description of the machine.

A A designate the main framing of the machine. In the upper part of said framing are the bearings for the feeding-rollers 25 26 27, the perforating-rollers 28, and the shafts 29 of the rotary cutters 30. The feeding-rollers may be of any known kind for feeding either a web B coming from a press where it has been printed or an unprinted web to the perforating-rollers. The perforating-rollers 28, which perforate the web the entire width before the operation of the cutters, are arranged at a suitable distance above the cutters to perforate the sheets at a suitable distance from the head 21 (see Fig. 1) before the severance of the sheet from the web on the line 22. The perforating-rollers are furnished, respectively, with a row of perforating-punches 31 and a slot or row of holes 32 in which said punches operate, and they operate once in each revolution. The cutters 30 represented are such as are the subject of Letters Patent No. 391,941, and as there are two sets on their shafts the latter make one revolution for every two of the perforating-rollers, the surface velocity of the said rollers and the speed of the edges of the cutters corresponding with the feed of the web.

Some distance below the cutters there are arranged in the framing A, side by side at some distance apart, two stationary tables E E', upon which the cut and perforated sheets are to be deposited in piles. Above these tables and below the cutters there are bearings in the framing for the shafts $b$ $b'$ $d$ of three rotary sheet-carriers C C' D, represented as consisting of reels furnished with grippers, said shafts being arranged parallel with those of the cutters and perforators. The said tables, which are supported on fixed bars 46 in the framing, extend in a direction parallel with the shafts of the reels the whole length of and some distance beyond the latter in a forward direction—that is to say, toward the left of Fig. 2. The reel C is arranged over the table E and the reel C' over the table E', and the reel D is arranged between C and C'. The said reels are respectively driven continuously in the directions of the arrows shown thereon in Figs. 4 and 7 at a surface velocity preferably slightly in excess of that of the perforating-rollers and cutters and of the movement of the web. The several disks 32 of the reels C, C', and D are furnished, respectively, with grippers 33 and gripper-pads 34. The grippers of the reel C serve the purpose of taking in succession from the cutters a number of cut sheets and depositing them one on another in a pile on the table E, while the grippers on the reels D and C' are inoperative. The grippers on the reel D serve the purpose of taking in succession a similar number of cut sheets and transferring them to the grippers of the reel C', to be thereby deposited one on another in a pile 50 on the table E', while the grippers on the reel C are inoperative, as will be hereinafter more fully described. It may, however, be here mentioned that the sheets taken by the reel D have the opposite sides inward to those taken by C; but in the transfer from D to C' the sheets are turned over, so that they are deposited on C' right side upward, to correspond with those deposited upon C. It may be further mentioned that the grippers of the reel C or D, whichever are in operation, seize the web before it is severed by the cutters, taking out any looseness that may exist between the feeding-roller 27 and the cutters, thus making it possible to cut sheets of uniform length. Between the cutters and the reels C D there is an upright guide 36 to direct the descending edge of the web to the grippers of the reels.

Figures 7, 12:
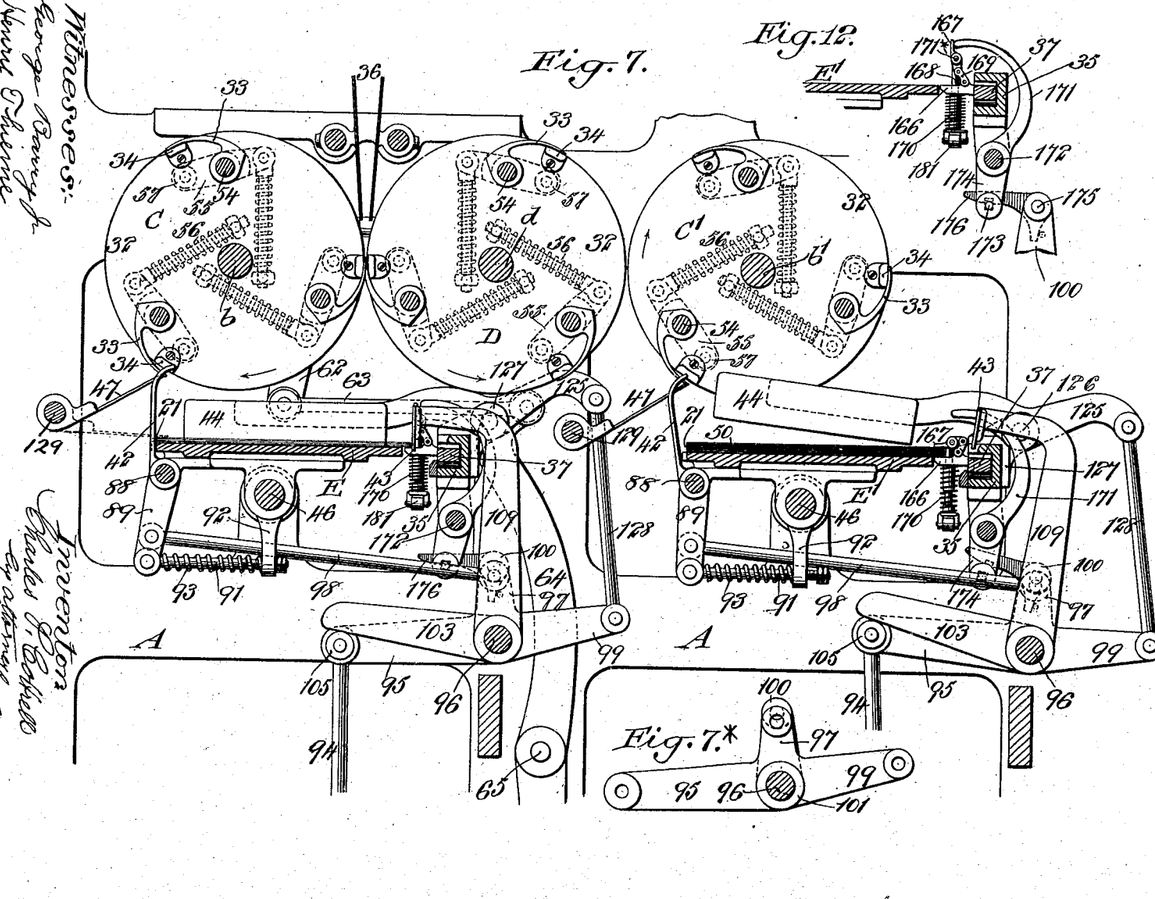
Fig. 7, a sectional view corresponding with Fig. 4, but on a larger scale, showing the two receiving-tables and the devices for piling the sheets thereon.
Figs. 10, 11, 12, 13, 14, 15, 16, 17, 18 are detail views, which will be hereinafter explained.

At one side of each of the tables there is respectively arranged one of two stationary frames F, in which are slides 35 for the two alternately-operated carriers, which consist of endless racks 37, furnished with grippers for taking hold at their edges 22 (see Fig. 1) of all the sheets which have been deposited in a pile 50 on the respective table and carrying the pile along the table in the direction indicated by an arrow 47* in Fig. 2 to a point thereon where the pile remains stationary at intervals and where there is arranged, on the opposite side of the table to the gripper-racks, one of two wire staplers, of which one is shown in Fig. 2, (designated as a whole by N O.) The width of the table bears such relation to the dimension of the sheets between the lines 21 22 that the edges 21 of the piles overlap the edges of the tables, as shown in Fig. 7, sufficiently to permit the grippers to take good hold at the said edges. It will be understood that the carriers constituted by the endless racks and their grippers run transversely to the axles of the rotary carriers or reels C D C'.

The endless racks and their grippers, except as to the means for operating the grippers, which will be hereinafter particularly described, are or may be like those in common use for paper-delivery and are carried by wheels 41 running on short stationary stud-axles 41*. The staplers may be of any suitable kind; but I prefer to use and have represented one such as is the subject of United States Letters Patent No. 613,210, which is well known.

On that side of each of the tables E E' at which the heads of the sheets—that is to say, the cut edges designated by the line 22 in Fig. 1—arrive when the sheets are deposited thereon by the respective reel C or C'—that is to say, the side opposite the gripper-racks 37 (see Figs. 4 and 7)—there is a stop 42, and on that side of the table at which the gripper-racks are arranged there is a jogger 43. There is also a transversely-arranged stop 44, Figs. 2, 4, 7, which I will term a "front" stop, arranged above each table at a point properly determined near the front end of its respective reel—that is to say, the end to the left in Fig. 1—and there is also a jogger 45 working on the rear part of each table for jogging the sheets forward toward its respective stop 44. On the same side of each table with its stop 42 there is arranged a presser 47 (see Figs. 2, 4, 6, 7) for the purpose of preventing the curling up of the heads of the sheets—that is to say, the edges 21—and holding them down upon the table.

I have thought it better to first describe thus far all the active functional elements of the machine—that is to say, those elements which act directly on the web, the sheets, and the pile—without at the same time entering particularly into the details of their organization and of the means for producing their operation. I will now proceed further with the description of those details.

Figure 3:
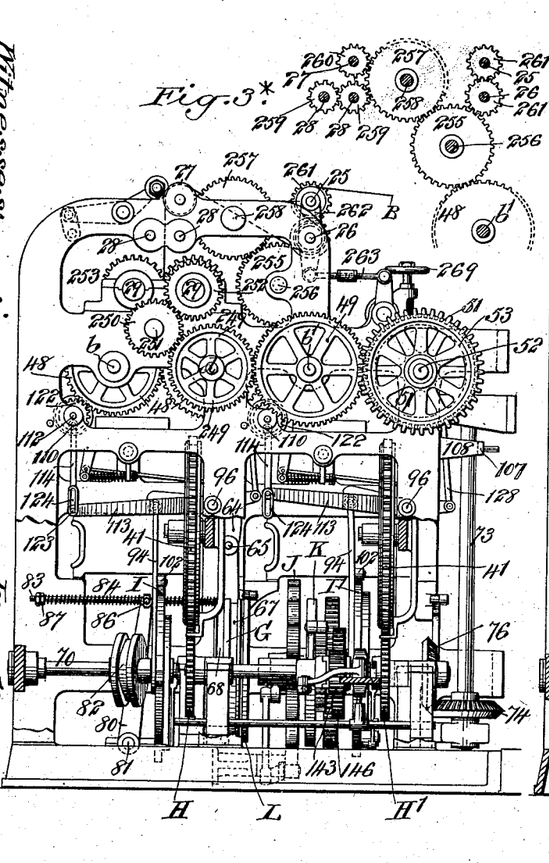
Fig. 3 is an elevation of that end of the machine which is to the right in Fig. 2, part of the framing being broken away to expose to view the mechanism behind it.

The three shafts $b$ $b'$ $d$ of the two delivery-reels C C' and transferring-reel D are geared together by three spur-gears 48 of equal size to rotate at equal velocities. Only two of these gears—viz., those of the reels C D—are shown in Fig. 3 and only that of the reel C in Fig. 2; but the third—viz., that of the reel C'—is shown in the detail view, Fig. 3*. The rotary motion of the several reels is derived through a spur-gear 49 on the shaft of C' from a spur-gear 51 on the shaft 52, which is the driving-shaft of the machine and which in the present example is furnished with a spur-gear 53, through which it is to receive motion from a printing-machine from which the web B is to be supplied. The teeth of the gear 51 are only shown in dotted outline in Fig. 3. The cutters are driven (see Fig. 3) from the gear 49 on the shaft of the reel C', the said gear driving a spur-gear 249, turning loosely on the shaft $d$ of the reel D and driving a gear 250, which turns loosely on a fixed stud 251 on the framing and which gears with a gear 252, fast on one of the cutter-shafts. The cutter-shafts are geared together by four gears 253. The perforators are represented as driven (see Fig. 3*) from the gear 48 on the shaft $b'$ of the reel C', which gears with and drives a gear 255, turning loosely on a fixed stud 256 and driving a gear 257, which turns loosely on a fixed stud 258, gearing with and driving one of two intermeshing gears 259, fast on the shaft of one of the perforators. The said gear 257 also gears with a gear 260 on the feed-roller 27 and so drives the said roller. The feed-rollers 25 26 are geared together by spur-gears 261, the said gear on 26 gearing with and deriving motion from the gear 255, before referred to. The roller 25 is made adjustable to give a proper tension to the web by being supported in the upper ends of levers 262, which are fulcrumed on the shaft of 26 and one of which has its lower end connected by a rod 263 with the arm 264 of a rock-shaft 265, which is arranged in fixed bearings on the framing A and on which is a worm-gear 266, gearing with an upright endless screw 267 in a fixed stand 268 on the framing. A hand-wheel 269 on this screw serves for turning it.

Figure 8:
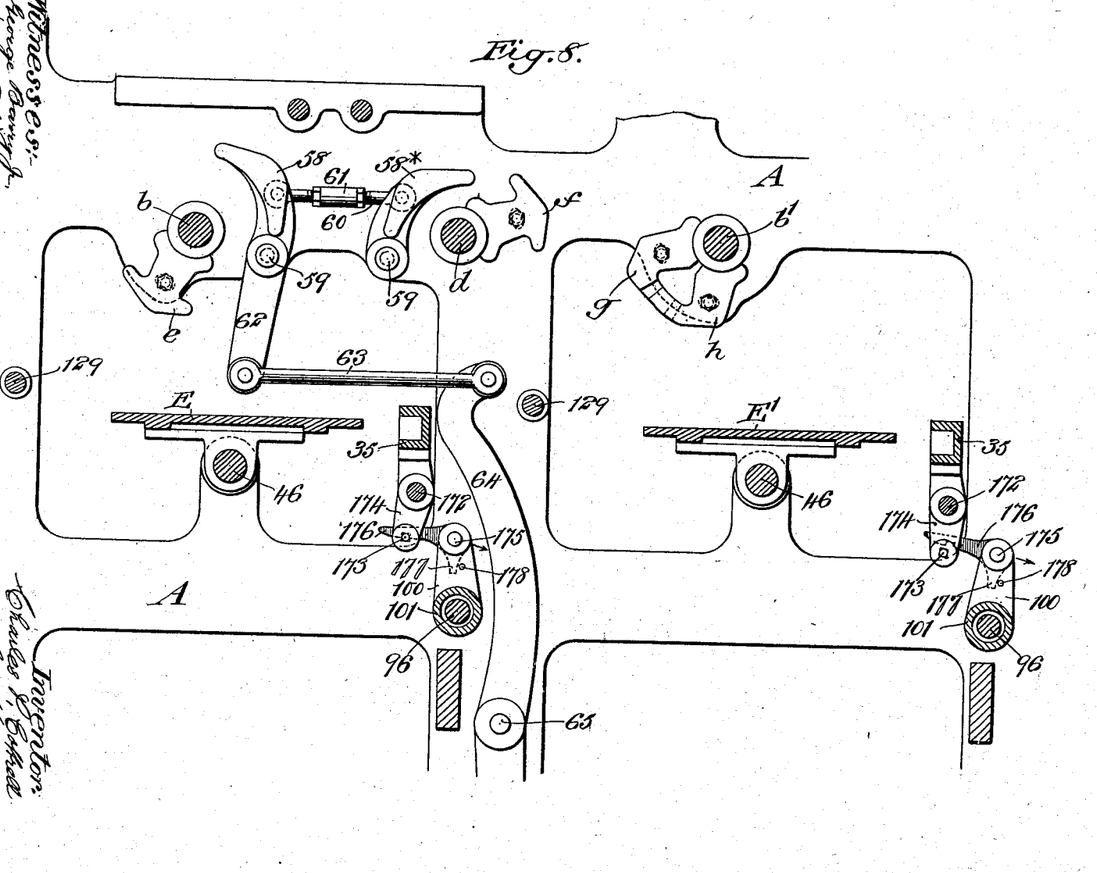
Fig. 8, a sectional view showing the two receiving-tables and devices for operating grippers which take the piled sheets from said tables to the stapling devices.

The reel-grippers 33, of which there are shown three sets on each reel, are carried by shafts 54, running through the several disks 32, and each of these shafts is furnished outside of the foremost disk of its respective reel, as shown in Fig. 2 and in dotted outline in Fig. 7, with a lever 55, to one end of which is applied in a well-known manner a spring 56, which exerts a constant tendency to close its respective grippers. At the other end of each lever 55 is a roller 57, which in the rotation of the reels is brought into contact with stationary cams for opening the grippers for the reception and delivery of the sheets. The said cams are all shown in Fig. 8, and those 58 and 58* for opening the grippers for the reception of the sheets are shown in dotted lines in Fig. 7. The said cams 58 and 58*, though stationary at the time of their operation, require only to be one at a time in the operative position, according as the sheets are to be taken by the reel C and deposited on the table E or by the reel D to be transferred to that C' and deposited on the table E', and for the purpose of permitting either one to be brought to its operative position while the other one is thrown to its inoperative position they are pivoted, as shown in Fig. 8, on fixed pivots 59, secured in or on the framing A, and are connected together by a rod 60, in which is a turnbuckle 61, by which its length can be adjusted to keep the cams separated at a proper distance. In Fig. 8 the cam 58 for the reel C is represented as thrown out from the center of the reel to its operative position within the range of the rollers 57, and that 58* thrown in so far toward the center of its reel D as to be inoperative upon the rollers. To provide for the shifting of the said cams, the cam 58 is extended downward in the form of a lever 62, which is connected by a rod 63 with the upper end of a lever 64, which works on a fixed fulcrum 65 on the framing and which is connected below its fulcrum by a rod 83 with a lever 80, which works on a fixed fulcrum 81, near the bottom of the framing, and which derives the necessary motion for the shifting of the cams 58 58* from a drunken cam 82 on a horizontal shaft 70, which runs in bearings in the lower part of the framing and to which a constant rotary motion is imparted at a suitably-slow speed from a worm 71 on the driving-shaft 52, which meshes in a worm-gear 72 on an upright shaft 73, running in bearings in brackets on the framing. On the lower part of this shaft 73 is a bevel-gear 74, which meshes with and drives a bevel-gear 76 on a horizontal shaft 75, which works in bearings in the lower part of the framing and on which is a spur-gear 77, meshing with and driving a spur-gear 78 on the said shaft 70, which carries the drum G.

Figure 4:
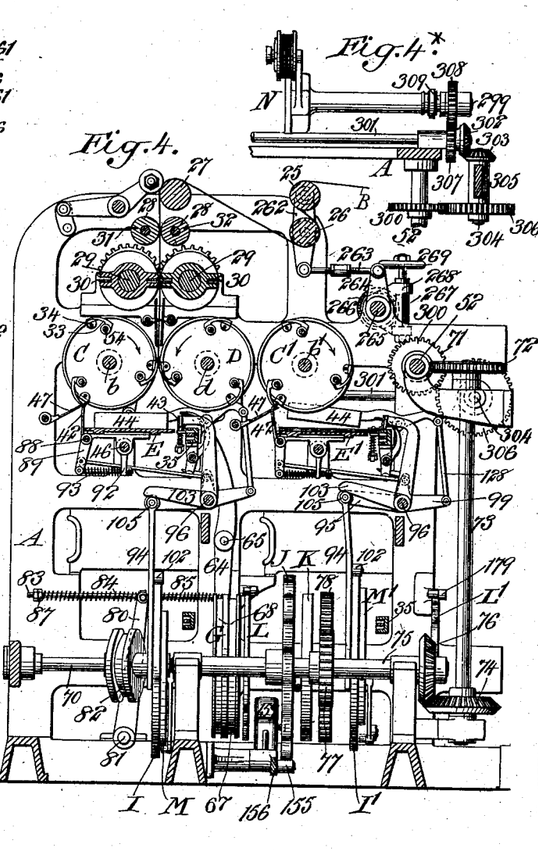
Fig. 4, a transverse section in the line 4 4 of Fig. 2 viewed from the right.
Figures 5, 6:
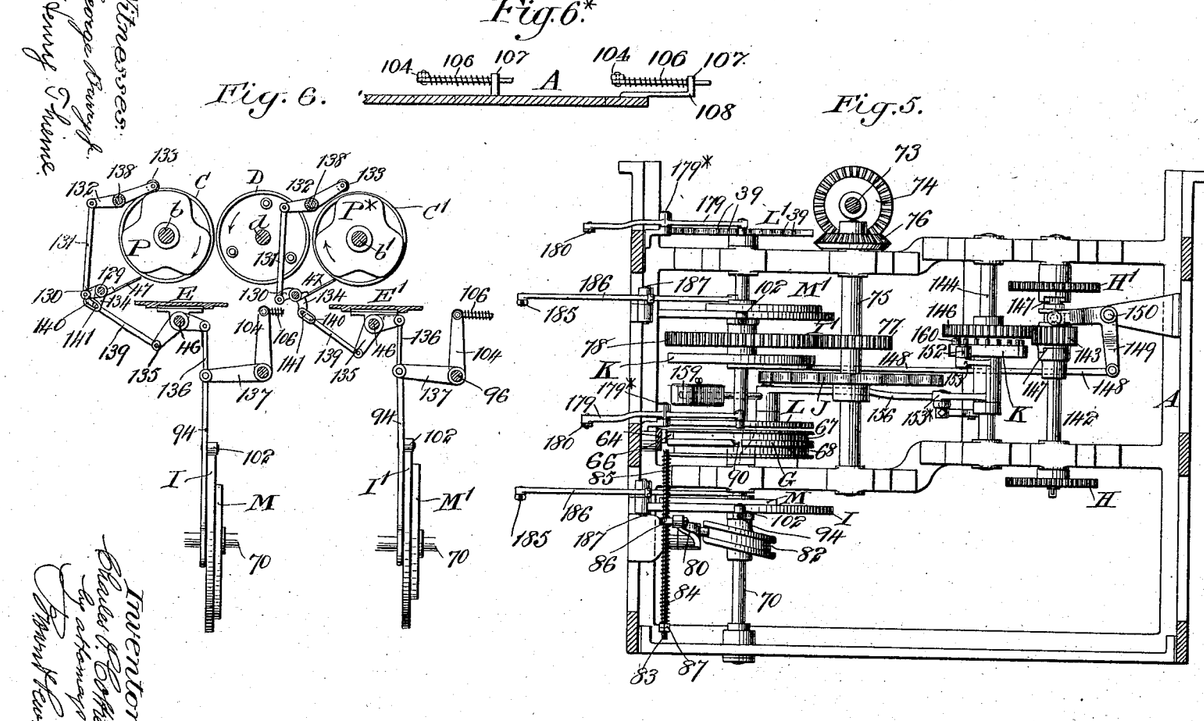
Fig. 5, a horizontal section in the line 5 5 of Fig. 2, omitting the gripper-chains which carry the piles of sheets along the receiving-tables to the stapling mechanism.
Fig. 6, a transverse sectional view of the two receiving-tables and of sheet-pressing devices employed in connection therewith.

For the purpose of locking the lever 80 either in position to hold the cam 58 operative and 58* inoperative, as shown in Fig. 8, or in the reverse position, the shaft 70 is furnished with a drum G, (see Figs. 2, 2ª, 3, 4, 5,) in which are two directly circumferential grooves 67 68, and the lever 64 is furnished at its lower end with a block 66 to run in one or other of said grooves, the said block running in the groove 67 to keep the cam 58 operative and in the groove 68 to keep the cam 58* operative. Between the grooves 67 68 of the drum there are two diametrically opposite openings 90, one of which is shown in Fig. 5, which are just wide enough to permit the transfer of the block 66 from one groove to the other at the proper time for the shifting of the cams 58 58* to change the operation of the reels C and D after C or C' has deposited the desired number of sheets for a pad on its respective table E or E'. This transfer of the block 66 must take place very quickly between the deposit of the last sheet of a pile on one table and the first sheet of a new pile on the other table, and to permit and produce this quick action the rod 83, which connects the lever 80 with the lever 64, has upon it two long coil-springs 84 85. The said rod passes through an eye on a pin 86 in the lever 80, and it is connected at one end to the lever 64. The said springs are coiled on said rod on opposite sides of said pin 86, one between said pin and the lever 80 and the other between the said pin and a stop 87, represented as a nut screwed onto the free end of the rod. As the cam 82 and the drum G rotate with the shaft 70, which makes but one revolution for the whole number of sheets to be deposited in two successive piles on the two tables E E', the cam 82 merely compresses one or other of the springs 84 85 until the block 66, running in one groove of the drum, arrives opposite one or other of the openings 90 between the grooves, when the compressed spring throws the block across through the said opening and so moves the lever 64 to the position to reverse the cams 58 58*, and as soon as the said opening passes the block the latter is locked by being confined in the other groove.

For the opening of the grippers 33 of the delivery-reel to deliver the sheets on the table E there is provided on the framing A a stationary cam e, Fig. 8, against which the rollers 57 of the said grippers run at the proper time. For the opening of the grippers of the transferring-reel D to deliver the sheets to the grippers of the reel C there is provided in the framing a stationary cam f, against which the rollers 57 of those grippers run at the proper time. For the opening of the grippers of the delivery-reel C' to receive the sheets from the grippers of the transferring-reel D there is provided on the framing a stationary cam g, and for opening the said grippers to deliver the sheet on the table E' there is similarly provided a stationary cam h. It may be observed that the cams e, g, and h, being all stationary, produce the opening of their respective grippers every time the latter pass them; but this opening is immaterial except when they are respectively required to receive or deliver a sheet.

The side stops, hereinbefore mentioned, one for each of the tables E E', consist each of a number of fingers 42, carried by one of two rock-shafts 88, (see Figs. 2, 4, and 7,) arranged in fixed bearings under the respective tables. Each rock-shaft is furnished with an arm 89, with which is connected a rod 91, which runs through a fixed stop 92, which is fastened on its respective table-supporting bar 46. Around this rod is coiled between said arm 89 and stop 92 a spring 93, which tends to hold the stop-fingers 42 upright against the adjacent edge of the table, in which position, as shown with respect to the table E in Figs. 4 and 7, said fingers of either table remain stationary during the deposit on that table of sheets enough for a pad, the stop-fingers of the other table in the meantime being thrown aside from the table, as illustrated with respect to the table E' in Figs. 4 and 7, to prevent the edges of the sheets from being abraded by them in the passage of the pads along the table. The throwing and holding aside of either stop is effected by one of two similar cams I I' on the rotary shaft 70, hereinabove described. The periphery of each of these cams is in the form of two concentric arcs 200 and 201 of different radius and two connecting-steps 202 203, the arcs 200 of similar radius occupying one hundred and eighty degrees of the periphery and the larger arc 201 and the steps 202 203 occupying the other one hundred and eighty degrees, the said cams being arranged in diametrically opposite positions on the shaft, as will be understood by reference to Fig. 2$^b$, which represents a transverse section of the shaft 70 and a side view of the cams. The said cams operate to throw aside the stop 42 through truck-rolls 102 on two rods 94, which are respectively connected with the arms 95 of two levers which are fitted loosely to two rock-shafts 96, which are fitted to bearings in the framing, another arm 97 of each lever being connected by a rod 98 with the arm 89 of the rock-shaft 88 of the respective side stop. The said levers have each, as shown in Fig. 7 and in Fig. 7*, which is a separate view of said lever, besides the two arms 95 97, above mentioned, for operating the side stops 42 two other arms 99 100, the purposes and operations of which will be hereinafter explained. The four arms all project from one sleeve 101, as shown in Fig. 7*, which is fitted loosely to the rock-shaft 96. This sleeve is also visible in Fig. 2. The rock-shafts 96 have a slight rocking movement independently of the four-armed levers above described for the purpose of producing the operations of the side joggers 43 and the pressers 47 and for throwing the side stops 42 into operation and the front stops 44 out of operation, as will be presently described.

Figures 9, 10:
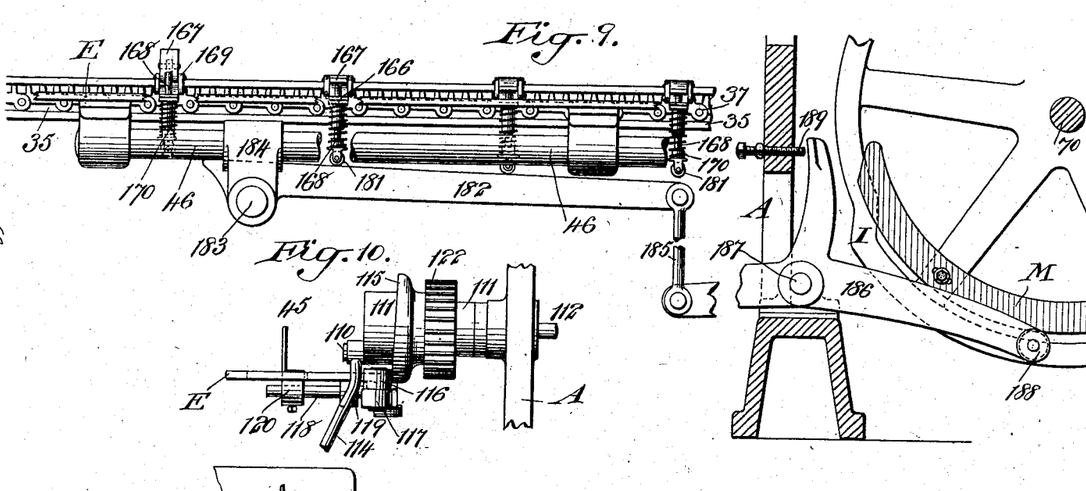
Fig. 9, a detail view of the mechanism for opening said grippers for the release of the stapled pads.
Figure 11:
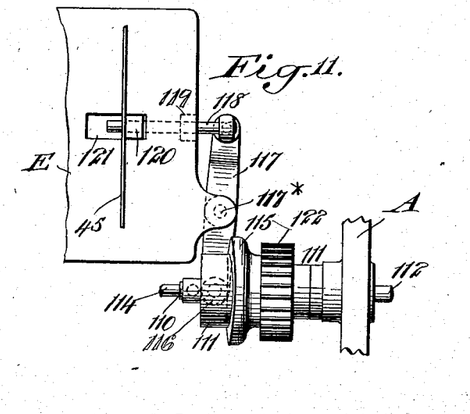

The side joggers 43 are carried by arms 109, affixed to the rock-shafts 96, which receive motion through the connections of their arms 113 (see Fig. 3) by rods 114 with eccentric-pins or crank-wrists 110, carried by sleeves 111, which turn on fixed axles 112, secured in the framing A. One of said sleeves, with its supporting-axle 112, and other appurtenances for working the end jogger 43 of the same table E are represented on a larger scale in Figs. 10 and 11, of which Fig. 10 represents a side view of the rear portion of said table, with the end jogger and parts of the mechanism for operating the said jogger and of the mechanism for operating the corresponding side jogger. The connection between each lever-arm 113 and rod 114 is made, as shown in Fig. 3, by a pin 123 on the lever 113 entering a slot 124 in the lower part of the rod 114. This slot-and-pin connection provides for the throwing and holding of the side joggers out of operation by the cams I I' at the same time that the side stops 42, belonging to the same table, are thrown and held out of operation by said cams. For the purpose of so throwing and holding the side joggers out of operation each rock-shaft 96 is provided with an arm 103, under which projects a roller 105 on the arm 95 of the four-armed lever. This roller when the latter lever is operated to throw back the side stops 42 of either table raises the said lever-arm 103 and by the consequent movement of the rock-shaft raises the lever-arm 113, and thus while throwing the jogger aside, as illustrated in Figs. 4 and 7, at the same time moves the pin 123 so far up in the slot 124 of the rod 114 as to be inoperative therein, the said rod 114 only operating to throw the jogger toward the table when the lower end of the slot 124 strikes the pin 123. To produce the movements of the rock-shafts 96 to throw the side joggers toward the table, each of said rock-shafts is furnished with an arm 104, (see Figs. 6 and 6*,) to which is applied a coil pushing-spring 106. The said spring 106 belonging to the left-hand table is represented in Fig. 6* as abutting against a fixed stop 107 on the framing A, and the spring 106 belonging to the right-hand table is represented as abutting against a stop 107 on a bracket 108, affixed to the framing A. Each of these springs 106 also by producing a downward pressure of the rock-shaft arm 103 on the arm 95 of the corresponding four-armed lever keeps the truck-roll 102 confined to the larger arc 201 of its respective cam I or I', and so holds the respective side stop and side jogger stationary when in their inoperative positions, and it also serves the purpose of depressing the said roller into the smaller and inoperative arc 200 of the cam when that arc is presented to the truck-roller, thus bringing the side joggers into operation and permitting the side stops to be thrown into operation by their springs 93.

For operating the end jogger 45 the sleeve 111 (represented in Figs. 10 and 11) has formed or affixed upon it a cam 115, which acts upon a roller 116 on one end of a short lever 117, which works below the table on a fulcrum 117* on the latter, the other end of the lever having pivoted to it the rear end of a rod 118, which works in a guide 119 under the table and to which is attached the stock 120 of the jogger, which projects through a guide-slot 121 in the table itself.

For the purpose of producing the rotary motion of the sleeves 111 with their crank-wrists 110 and cam 115, above described, each of said sleeves is furnished with a spur-pinion 122, through which it derives rotary motion from the driving-gear 48 of its respective reel C or C', as illustrated with respect to the pinion 122 and gear 48 of the reel C in Fig. 3, the said gear and pinion being so proportioned that the sleeve for each revolution of the reel makes as many revolutions as there are grippers on the reel—viz., three in the example represented—in order that each of the joggers and rock-shafts 96 may make one movement for every sheet deposited on the table.

The front stops 44, which rest stationary on the tables during the piling of the sheets thereon, as shown with respect to the table E in Figs. 4 and 7, have to be raised, as shown with respect to the table E' in those figures, high enough to permit the complete piles to pass under them on their way to the staplers. For this purpose said stops 44 are carried each by one of two levers 125, which are arranged transversely to the tables on fixed fulcrums 126 on any suitable supports at the sides of the tables. These supports consist in the example represented of brackets 127 on the rack-slides 35. The said levers are connected by rods 128 with the arms 99 of the four-armed levers before described, and it may be understood by the description of the operation of these levers by the cams I I' that the said stops belonging to either table will be raised to their inoperative position by the action of those cams at the same time as the side stops and side joggers are thereby thrown out of operation. The springs 106 by their action on the rock-shaft 96 and the four-armed lever, as before described, serve the purpose of returning said stops to their operative position on that table on which the piling is to be performed.

The pressers hereinbefore mentioned, one for each of the tables E E', consist each of a number of fingers 47, projecting, as shown in Figs. 4, 6, and 7, over the edge of the table from a rock-shaft 129, arranged at a short distance from the table in bearings in or on the framing A. These rock-shafts have each an arm 130, which is connected by a rod 131 with one arm of one of two levers 132, which work on fixed fulcrums 138. Other arms of the said levers furnished with truck-rollers 133 project over three-leaved cams P P*, (see Fig. 6,) provided, respectively, on the ends of the two reels C C', said cams operating to raise the presser-fingers 47 high enough from their respective table to permit every sheet deposited thereon by the respective reel to pass under said fingers, which after each leaf of their respective cam passes the respective lever 132 are allowed to descend upon the sheet and hold down its adjacent edge against any tendency to curl up which may have been produced by the reel-grippers. It is only on that table on which the piling up of the sheets is being performed that the operation of the pressers is at any time required, the fingers of the other table along which the piles of sheets are being carried by the grippers to and beyond the staplers requiring in the meantime to be held up positively to permit the passage of the piles under them. For this latter purpose each rock-shaft 129 is furnished with an arm 134, which is connected by a rod 139 with one arm of an elbow-lever 135, which is fitted loosely to the respective table-supporting bar 46, and the other end of said lever 135 is connected by a rod 136 with an arm 137 on the rock-shaft 96, so that as the said rock-shaft is turned by the action of one of the cams I I', as hereinbefore described, through the cam-rod 94 and the four-armed lever to throw the side joggers 43, the side stops 42, and the front stops 44 of each table out of operation the said rock-shaft also lifts and holds the corresponding pressers to their inoperative position. In order that when the presser of either table is required to operate, the cam I or I' and its connections above described with the arm 134 of the rock-shaft 129 may not interfere with it, a slot 140 is provided in the rod 139 for the reception of the connecting-pin 141 in the arm 134, which pin when the presser is in operation moves back and forth freely in said slot.

Figure 13:
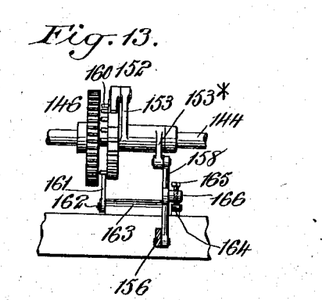
Figure 14:
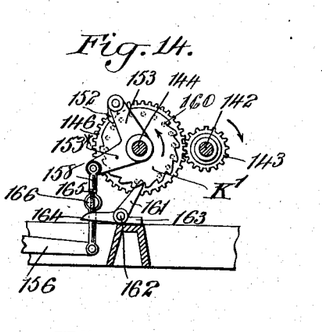
Figures 15, 17:
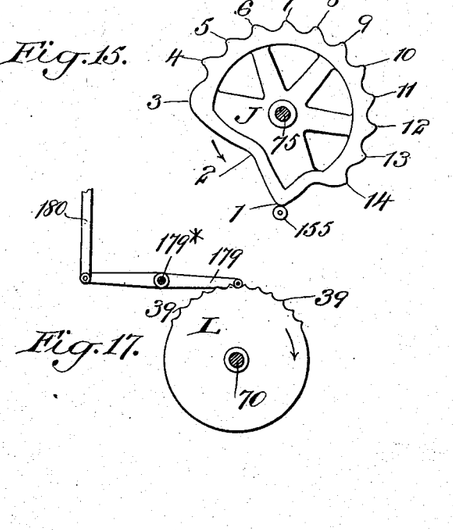
Figure 18:
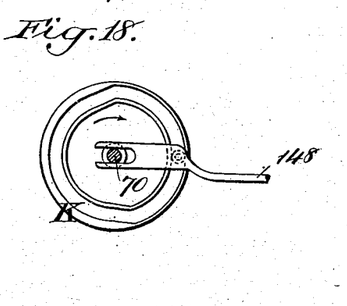

The movements of the toothed gripper-racks 37 for carrying the piles of sheets along the tables to the staplers step by step, according to the number of staples to be inserted and their distances apart, are derived, respectively, from two intermittently-rotating spur-gears H H', which are carried by a horizontal shaft 142, arranged parallel with the shafts 70 and 75 in bearings in the lower part of the framing and which gear, respectively, with the said racks. The said shaft 142 is furnished with a spur-gear 143, which derives motion from a spur-gear 146, fast on a similarly-arranged horizontal shaft 144, which derives an intermittent rotary motion from a cam J, (see Figs. 2 and 5,) on the continuously-rotating shaft 75, before described. The gear H is fast and the gear H' loose on the shaft 142. The gear 143 is fitted both to turn and slide on the said shaft and is furnished on each side with a clutch member 147 to engage with one of two corresponding clutch members provided, respectively, on the shaft 142 and on the loose gear H', so that by shifting the gear 143 in one direction or the other along the shaft the said gear while remaining in gear with the gear 146 may engage either with the shaft to drive the gear H or with the gear H' to drive the latter, according to which of the two gripper-racks is required to be in operation, the other rack being in the meantime stationary. The shifting of the gear 143 is effected through a horizontal lever 149, working on a fixed fulcrum 150, by means of a cam K (see Figs. 5 and 18) on the continuously-rotating shaft 70, hereinbefore described. Fig. 18 is a side view of the cam K, which operates on the shifting lever 149 through a rod 148, connected with said lever. The intermittent rotary motion of the shaft 144 is obtained from the cam J, before mentioned, through a ratchet-wheel K', (see Figs. 2, 5, 13, 14, 16,) fast on said shaft, and a pawl 152, carried by one arm 153 of a bell-crank 153 153*, working loosely on said shaft, the movement of the said bell-crank being obtained from the said cam J by the action of said cam upon a truck-roll 155 on a lever 156, which works on a fixed fulcrum 157 and is connected by a rod 158 with the other arm 153* of the bell-crank 153. The said lever 156 is represented as furnished with a counterbalance 159. Fig. 13, just above mentioned, represents a front view of part of the shaft 144 and its operating mechanism which has been in part just described, and Fig. 14 represents a section corresponding with Fig. 13. Fig. 15 is a side view of the cam J, and Fig. 16 a side view of the ratchet-wheel K'. In Figs. 13, 14 there is also shown an adjustable stop device for preventing the ratchet-wheel K' from being moved too far by the pawl 152 and for locking the said wheel after each movement, said device consisting of a series of pins 160, projecting from the inner face of the ratchet-wheel, and a dog 161, which engages with said pins. The said dog is carried by a short arbor 162, which turns in a bearing 163 in the framing and on which is an arm 164, which projects under the front of a screw 165, which is screwed through a boss 166 on one side of the rod 158. This screw is adjusted higher or lower, so that as the rod 158 makes its downward movement to produce the movement of the ratchet-wheel by the pawl 152 the said screw by its action on the arm 164 will so press the dog 161 against one of the pins 160 as to stop the movement of the said wheel, which will then be locked between the pawl and the dog, the shaft 144 being thus locked against turning in either direction.

Figure 16:
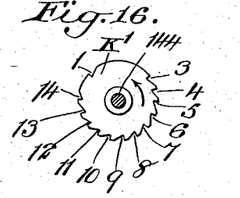

The form of the cam J and the number and arrangement of the teeth and spaces in the ratchet-wheel K', which will be presently explained with reference to Figs. 15 and 16, depend upon the number and distance apart of the staples to be inserted in a pad and the distance of the staplers from those placed on their respective tables where the sheets have been piled to form the pads. In the example represented there are twelve staples to be inserted at equal distances apart, and hence the movements of the gripper-racks have to be first a comparatively long one to take the pile to the position to receive the first staple and afterward twelve shorter ones to bring the several staple-receiving points of the pad successively to the staplers and take the pad beyond the staplers, where it may be removed from the table by an attendant or whence it may be delivered by any suitable means. To produce these movements, the perimeter of the cam is divided into eighteen (18) spaces of twenty degrees each. The distance, as shown in Fig. 15, between the points 1 and 2 is equal to two of said spaces, or forty degrees. The distance from 2 to 3 is equal to three of those spaces, or sixty degrees. The several distances, numbered consecutively 3 to 14, are twenty degrees each, and the distance from 14 to 1 is equal to two spaces, or forty degrees. The ratchet-wheel K has its perimeter divided similarly to that of the cam J, as will be understood by reference to Fig. 16, in which there are teeth numbered from 1 to 14 to correspond with the similarly-numbered projections of the cam and a tooth 1 corresponding with the projection 1 of the cam. When the lever 156 is in the position shown in Figs. 2 and 14, the movement of one rack effected by the gear H or H' has just been completed, and while the truck-roller 155 on said lever is passing from 1 to 2 on the cam J the clutch 147 on the shaft 142 is operated, as hereinbefore described, by the cam K (see Figs. 2 and 18) on the shaft 70 to disengage that gear from its driving-gear 143 and the engagement with the latter of the other gear H or H'. When the said roller 155 is at 2, the pawl 152 engages with the tooth 3 on the ratchet-wheel K'. The long throw from 2 to 3 of the cam J produces a long enough movement of the rack to carry the pad pile from the respective front stop 44 to a proper position relatively to the stapler to receive the first staple. At the end of each of the succeeding eleven movements of the chain produced by the cam J and ratchet-wheel K' the pad pile receives a staple for each movement. The last movement of the chain produced by the portion of the cam 14 to 1 carries the pad out from and clear of the stapler.

Figure 19:
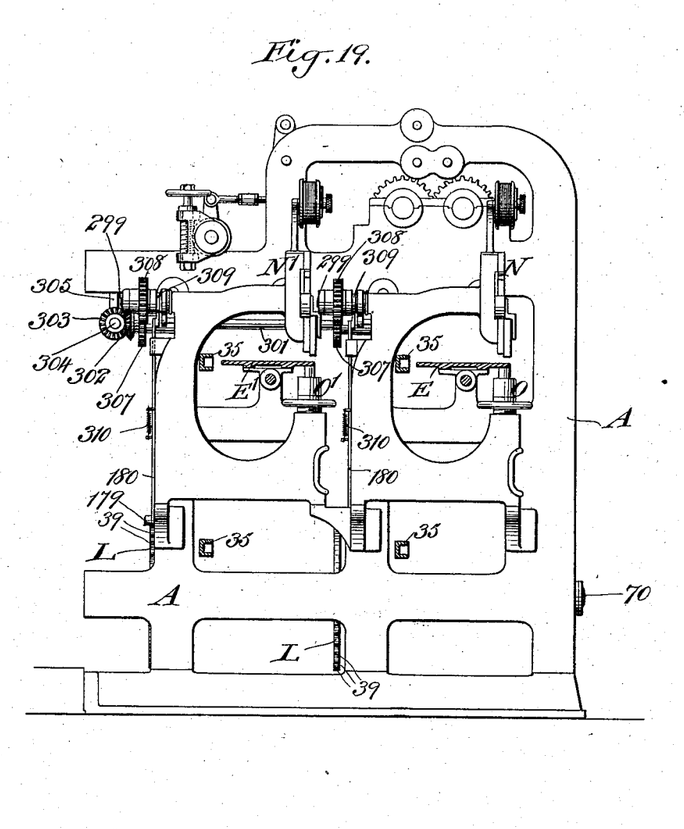
Fig. 19 is a transverse sectional view taken in the line 19 19 of Fig. 2, looking from the left, to show the staplers and their controlling mechanism.

The staplers, one for each table, one of which is shown in Fig. 2, (designated as a whole by the letters N O) and both of which are shown in Fig. 19, (designated, respectively, by N O and N' O',) have their separate rotary shafts 299 driven continuously from a gear 300 on the driving-shaft 52 through a horizontal shaft 301, Figs. 2, 4*, and 19, arranged transversely just behind the stapler. This shaft 301 receives its motion through a bevel-gear 302, fast on one end of it, from a bevel-gear 303, fast on one end of a short horizontal shaft 304, which turns in a bearing on a bracket 305, affixed to the framing A, said shaft 304 having also fast on it a spur-gear 306, Figs. 4 and 4*, through which it derives motion from said gear 300 on the driving-shaft 52. The said shaft 301 has also fast upon it two spur-gears 307, gearing, respectively, with two gears 308, one on each of the shafts 299 of the staplers. These gears 308 are loose on said shafts 299 and coupled therewith by couplings 309, which are normally uncoupled. It will not be necessary to further describe the staplers themselves, as they are in common use and are the subject of United States Patent No. 613,210. For the purpose of producing the engagement of either gear 308 with its respective shaft 299, according to which of the tables E E' the pads have been formed upon and require to be stapled, two similar cams L L' are provided on the continuously-rotating shaft 70. These cams, a side view of one of which is given in Fig. 17, are simply circular disks, on the peripheries of which are twelve projections 39, arranged at regular intervals of twenty degrees. The said cams are set in opposite directions, so that they operate properly in turn each on its respective stapler-coupling. Their operation is produced through levers 179, which work on fixed fulcrums 179* and are connected by rods 180 with the respective couplings 309. These rods are so connected, as shown in Fig. 19, by springs 310 with fixed points on the framing, as to be thereby continually pushed upward, and to thereby hold each lever 179 to the periphery of its respective cam. The cam L or L' belonging to that stapler which is not in operation has the plain circular portion of its periphery presented upward to its lever 179 and permits its rod 180 to be pushed up by its spring 310 to a position in which it leaves the coupling of its stapler-shaft uncoupled and the stapler on that side inoperative. The other cam, which has its projections 39 presented upward, operates by every one of said projections in succession to depress its respective rod 180 and by every one of such successive operations throws its respective stapler-coupling 309 into action and produces an operation of the stapler. The cams L L', it is obvious, must be so arranged on the shaft 70 with respect to the cam K on the same shaft and to the arrangement of the cam J on the shaft 75 that the staplers operate during the temporary stoppages of their respective carrier 37.

The pile-grippers carried by the racks 37 consist, as shown in the transverse sectional views, Figs. 7 and 12, of lower members 166, fixed at suitable intervals to each rack and projecting therefrom toward the respective table and upper members 167 in the form of short levers connected by pivots 171* with the upper ends of upright rods 168, which work through the members 166, the tails or outer ends of the said members 167 having toggle-link connections 169 with the lower member 166. The said rods 168 have springs 170 applied to them below the members 166 in such well-known manner as to hold the upper member raised and the gripper open, as illustrated in Fig. 7 with respect to the grippers belonging to the table E and in Fig. 12 with respect to those of the other table E' or to depress the upper member and close the grippers, as illustrated in Fig. 7 with respect to the grippers belonging to the table E'. The grippers remain normally open, those of either rack being only closed at the proper moment to take hold of a pile of sheets on the respective table and remaining closed long enough for the chain in its course to carry the said pile along the table to and past the stapler and to the point of delivery. The closing of the grippers is effected at the proper time—that is to say, whenever a pile has been completed on their respective table by means of a number of arms 171, one for each of as many grippers as it is necessary to close on a rock-shaft 172, which works in suitable fixed bearings under the table and which gets the necessary movement for this purpose from the arm 100 of the four-armed lever, which is operated, as hereinbefore described, by the cam I or I' appertaining to the respective table, connection being made between the rock-shaft and the said lever-arm 100, as best shown in Fig. 8, by means of a tripping-hook 176, attached by a pivot 175 to said arm and engaging by its own weight with a pin 173 in or on an arm 174, which projects downward from the rock-shaft. This movement requires to be very slight, only sufficient to push the points of the movable gripper members far enough from the position shown in Fig. 12 to produce the outward flexure of their toggles, the spring 170 then instantly closing them. In order then to produce the disengagement of this hook from the said pin 173 the instant it has performed its duty, the said hook is provided with a downwardly-projecting tail 177, behind which a pin 178 projects from the lever-arm 100. At the time the movement of the lever-arm 100 begins for the purpose of operating the rock-shaft 172 (the direction of which movement is indicated by arrows in Fig. 8) the tail 177 of the hook 176 is clear of the pin 178, as shown with respect to the left-hand rock-shaft 172 in Fig. 8; but as the said movement proceeds the pin 178 descending slightly allows the hook to drop with it until the tail 177 is stopped by the pin 178, after which the further movement of the arms 174, causing the hook to move upward about the axis of the rock-shaft 96 and not on its pivot 175 while the pin 173 continues descending, disengages the hook from said pin, as shown with respect to the right-hand rock-shaft 172 in Fig. 8. When the pin 173 is thus released, the rock-shaft 172 and its arms 171 are caused to return by the weight of said arms to the position in which they are shown at the right of Fig. 7. When the movement of the four-armed lever is reversed by the means hereinbefore described, the reëngagement of the tripping-hook 176 with the pin 173 is effected by the weight of the hook itself, the sloped under side of the point of which rests upon the pin 173 until its gab drops over the latter.

To provide for the opening of the rack-grippers for the release of the stapled pads, the gripper-rods 168 are each furnished with a roller 181, which at the proper time runs onto a track-cam constituted by the inclined upper edge of one of two bars 182, (see Figs. 2 and 9,) each of which is attached at one end by a pivot 183 to a hanger 184, fastened to the supporting-bar 46 of its respective table E or E'. The other end of said bar 182 is connected by a rod 185 with a three-armed lever 186, which works on a fixed fulcrum-pin 187 on the framing A, another arm of the said lever being furnished with a truck-roller 188, which is within the range of one of two cams M M', (see Figs. 2, 5, and 9,) carried, respectively, by the two cams I I', and a third arm of the said lever projecting upward opposite to an adjustable stop-screw 189, which is tapped into the framing A. When the time arrives for the opening of the grippers of either gripper-rack to operate, its respective cam M or M', by its action on the truck-roller of the said three-armed lever, raises the bar 182 to the position shown in Fig. 9, in which each pair of grippers in turn by the passing of its roller along the said bar is thrown open. When either cam is not in operation, the weight of the bar 182, rod 185, and lever 186 brings the bar so far below the gripper-rollers 181 that the said bar is inoperative.

It will be understood that by the several cams on the one shaft 70 not only are there produced all the changes in the operation of the machine necessary for depositing the sheets by either one of the reels in a pile on its respective table E or E', while the sheets previously piled by the other reel on the other table are being carried forward thereon and being stapled, but there are also produced all the changes whereby all the parts of the machine necessary to the operation proceeding on one table are kept or allowed to remain in action, while the parts not necessary to the operation proceeding on the other table are thrown and kept out of action. The gearing through which said shaft 70 derives motion from the driving-shaft 52 has been described, but I have not indicated the speed at which the said shaft must rotate with respect to the reels. This, it will be readily understood, depends both upon the number of sets of grippers on the reels and the number of sheets of which the pads are to be composed. In the machine represented, in which the reels have each three sets of grippers and the pads are to be composed of one hundred sheets each, the said shaft 70 is required to make thirty-three and one-third revolutions for each revolution of the reels.

What I claim as my invention is—

1. The combination of a cutter for cutting sheets from a web, a table for receiving the cut sheets, and a rotary carrier interposed directly between the cutter and the table and furnished with grippers which take the cut sheets directly from the cutter and lay them directly upon the table one upon another in a pile, substantially as herein described.

2. The combination of a table, a rotary sheet-carrier for laying sheets one upon another in a pile on said table, and a carrier running transversely to the first-mentioned carrier for carrying away the so-laid piles of sheets along the said table, substantially as herein described.

3. The combination of a table, a sheet-carrier for depositing sheets one upon another in a pile on said table, a stapling device beside said table, and a carrier arranged to run transversely to the first-mentioned carrier and having an intermittent movement for carrying the so-deposited pile along the table to and past the stapling device and holding it opposite said stapling device from time to time for the reception of staples, substantially as herein described.

4. The combination of a table, a sheet-carrier for depositing sheets one upon another in a pile on said table, a carrier running transversely to the first-mentioned carrier for carrying the so-deposited sheets along said table, a front stop above said table for stopping the sheets deposited thereon by the first-mentioned carrier in proper position lengthwise of the table to be taken by said transversely-running carrier, and means for moving said stop out of the way of the pile to permit its movement along the table by the latter carrier, substantially as herein described.

5. The combination of a table, a rotary sheet-carrier for laying sheets one upon another in a pile on said table, a carrier running transversely to the first-mentioned carrier for carrying the so-laid piles of sheets along said table, and a side stop for stopping the sheets as they are laid on said table by said first-mentioned carrier in proper position crosswise of the table to be taken by said transversely-running carrier, substantially as herein described.

6. The combination of a table, a sheet-carrier for depositing sheets one upon another in a pile on said table, a carrier running transversely to the first-mentioned carrier for carrying the so-deposited sheets along said table, a stop on one side of the table for stopping the so-deposited sheets in a proper position crosswise of the table to be taken by said transversely-running carrier and means for moving aside said side stop and holding it aside during the operations of the latter carrier, substantially as herein described.

7. The combination of a table, a sheet-carrier for depositing sheets one upon another in a pile on said table, a carrier running transversely to the first-mentioned carrier for carrying the so-deposited sheets along said table, a stop on one side of the table for stopping the so-deposited sheets in a proper position crosswise of the table to be taken by said transversely-running carrier, and a side jogger at the opposite side of the table for jogging said sheets to said stop, substantially as herein described.

8. The combination of a stationary table, a sheet-carrier for depositing sheets one upon another in a pile on said table, a second carrier running transversely to the first-mentioned carrier for carrying the so-deposited sheets along said table, a presser at one side of the table, means for giving said presser an upward movement to permit the passage under it, during the movement of said second carrier, of each sheet deposited upon the table by the first-mentioned carrier, and means for giving said presser a downward movement to press down each of the so successively-deposited sheets, substantially as herein described.

9. The combination herein described of a perforating device and a cutter for successively perforating a web and cutting therefrom sheets containing the perforations, a table, a sheet-carrier interposed between said cutter and table for depositing upon the table in a pile the so-cut perforated sheets, a stapling device at one side of said table, and a carrier having an intermittent movement transversely to the movement of the first-mentioned carrier for carrying the so-deposited pile along the table to and past the stapling device and holding it there from time to time for the reception of staples, the whole operating as herein set forth to produce from a web a stapled sheet-pad each sheet of which is perforated for tearing.

10. The combination of two rotary sheet-carriers consisting of reels and attached grippers and rotating in opposite directions, two movable cams one for each carrier for opening the grippers for the reception of sheets and means for simultaneously placing each of said cams in an operative position and for placing the other one in an inoperative position, substantially as herein described.

11. The combination of two rotary sheet-carriers consisting of reels and attached grippers and rotating in opposite directions, two movable cams one for each carrier for opening the grippers for the reception of sheets, connections between said cams whereby when one is in an operative position the other is in an inoperative position, and means for controlling said positions of the two cams, substantially as herein described.

12. The combination of two tables and three rotary carriers one of said carriers above one of said tables for depositing sheets thereon, another of said carriers above the other of said tables for depositing sheets thereon, and the third of said carriers located between the other two for presenting sheets directly to one of them, substantially as herein described.

13. The combination of means for presenting sheets, two tables arranged side by side for the reception of the presented sheets and three rotary carriers, one of said carriers for receiving certain of the presented sheets and depositing them directly on one of said tables, the second of said carriers for directly depositing other of the presented sheets on the other of said tables, and the third of said carriers arranged between the other two for receiving said others of the presented sheets and transferring them directly to said second one of said carriers to be thereby directly deposited on the other of said tables, substantially as herein described.

14. The combination of two tables for the deposit of sheets, three rotary carriers furnished with sheet-grippers, two of said carriers being located above said tables for depositing sheets directly thereon and the third interposed between the other two, and cams for operating the grippers of the several carriers whereby while those of one of said two carriers are operative for receiving sheets and depositing them directly on one of said tables those of both the other carriers are inoperative and while the grippers of said one carrier are inoperative those of the intermediate carrier are operative to receive sheets and transfer them directly to the other of said two carriers and those of the other of said two carriers are operative to receive sheets directly from said intermediate carrier and deposit them directly on the other of said tables, substantially as herein described.

15. The combination of a cutter for cutting sheets from a web, two tables arranged side by side for the alternate reception of so-cut sheets, and three rotary carriers located between said cutter and tables, one of said carriers for receiving so-cut sheets directly from the cutter and depositing them directly on one of said tables and the second one for directly depositing other so-cut sheets on the other of said tables and the third one, interposed between the other two, for receiving said other so-cut sheets and transferring them directly to said second one of the carriers to be thereby directly deposited on said other of said tables, substantally as herein described.

16. The combination of a cutter for cutting sheets from a web, two tables arranged side by side for the alternate reception of so-cut sheets, three rotary carriers each consisting of reels and attached grippers, one of said carriers for receiving so-cut sheets and depositing them on one of said tables and the second one for depositing other so-cut sheets on the other of said tables and the third one, interposed between the other two for receiving said other so-cut sheets and transferring them to the said second carrier, movable cams for opening the grippers of the first-mentioned and interposed carriers for the reception of sheets, means for shifting said cams whereby only one at a time is operative, cams for opening the grippers of the three carriers for releasing the sheets, and cams for opening the grippers of the first-mentioned and interposed carriers, substantially as herein described.

17. The combination of two tables, stapling devices one for each table, carriers one for each table for carrying piles of sheets along said table to its respective stapling device, and means for producing and controlling the operations of the two stapling devices whereby when one is in operation the other is inoperative, substantially as herein described.

18. The combination of two tables and means for depositing sheets one after another in a pile on each table, carriers one for each table for carrying so-deposited piles along said table, and means for producing and controlling the operations of the two carriers whereby when one is in operation the other is inoperative, substantially as herein described.

19. The combination of two tables and means for depositing sheets one after another in a pile on each table, stapling devices one for each table, carriers one for each table for carrying so-deposited piles along said table to its respective stapling device, means for producing and controlling the operations of said carriers and stapling devices whereby both the carriers and stapling devices of each table are inoperative while those of the other table are in operation, substantially as herein described.

20. The combination of two tables and means for depositing sheets one after another in a pile on each table, stops one for each table arranged at one side thereof to stop each so-deposited sheet in position laterally to said table, carriers one for each table for carrying so-deposited piles along it, means for producing and controlling the operations of said carriers and stops whereby one stop is placed in an operative position while its respective carrier is inoperative and the other of said stops is placed in an inoperative position while its respective carrier is in operation, substantially as herein described.

21. The combination of two tables and means for depositing sheets one after another in a pile on said table, pressers one for each table for pressing and holding down each so-deposited sheet, carriers one for each table for carrying so-deposited piles along it, and means for producing and controlling the operations of said carriers and pressers whereby either presser is operative while its respective carrier is inoperative and the other presser is inoperative while its respective carrier is in operation, substantially as herein described.

22. The combination of two tables and means for depositing sheets one after another in a pile on each of said tables, stops one for each table arranged at one side thereof to stop each deposited sheet in proper position laterally to said table, carriers one for each table for carrying so-deposited piles along it, pressers one for each table arranged at one side thereof for pressing and holding down each so-deposited sheet against its respective stop, and means for producing and controlling the operations of said carriers, stops and pressers whereby each stop and its respective presser are operative while their respective carrier is inoperative and the other stop and presser are inoperative while their respective carriers are in operation, substantially as herein described.

23. The combination of two tables and means for depositing sheets one after another in a pile on each table, stops one for each table arranged at one side thereof to stop each so-deposited sheet in position laterally to said table, joggers one for each table arranged on the opposite side thereof to its said stop for jogging the sheets toward said stop, carriers one for each table for carrying so-deposited piles along it, means for producing and controlling the operations of said carriers, stops and joggers whereby one of said stops and its respective jogger are made operative while their respective carrier is inoperative and the other stop and jogger are inoperative while their respective carrier is in operation, substantially as herein described.

24. The combination of two tables and means for depositing sheets one after another in a pile on each table, carriers one for each table for carrying so-deposited piles along it, front stops one for each table arranged crosswise of the direction of the movement of the carriers, joggers for jogging the so-deposited sheets toward said stops and means for producing and controlling the operation of said carriers, stops and joggers whereby one of said stops and its respective jogger are made operative while their respective carrier is inoperative and the other stop and jogger are inoperative while their respective carrier is in operation, substantially as herein described.

25. The combination of two tables and means for depositing sheets one after another in a pile on each table, stapling devices one for each table, carriers one for each table for carrying so-deposited piles of sheets along said table to its respective stapling device, front stops and back joggers one of each for each table for bringing the sheets and piles to proper positions on the table to be taken by its carrier toward its respective stapler, and means for producing and controlling the operations of the staplers and carriers and of said stops and joggers whereby one of said stops and its respective jogger are made operative while their respective carrier and stapling device are at rest and the other of said stops and joggers are made inoperative while their respective carrier and stapling device are in operation, substantially as herein described.

26. The combination of two tables and two rotary carriers furnished with grippers for the reception of sheets to be deposited on one and the other of said tables, connected cams located within the range of said carriers for producing the opening of said grippers by the rotation of the carriers, a lever for shifting said cams to place one in an operative and the other in an inoperative position, a rotary shaft, a cam on said shaft for shifting said lever, and a drum on said shaft having two circumferential grooves between which are openings for the transfer of said lever from one groove to the other for holding the first-mentioned cams with one or other of them in its operative position, substantially as herein described.

27. The combination of two tables, two rotary carriers furnished with grippers for the reception of sheets to be deposited in piles on one and the other of said tables, means for opening said grippers, stapling devices one for each table, driving mechanism for said stapling devices, two carriers consisting of endless racks one for each table running lengthwise thereof to carry the so-deposited piles to the stapling devices, a rotary shaft furnished with gears one for driving one and the other for driving the other of said endless-rack carriers, a clutch on said shaft for coupling one of said gears with and uncoupling the other from said shaft, a rotary cam for controlling the said means for opening the grippers of one and the other of said rotary carriers, two rotary cams one for each stapling device for coupling one with and uncoupling the other from its driving mechanism, a rotary cam for operating said clutch and a rotary shaft carrying all of said cams, substantially as herein described.

28. The combination of a table and means for depositing sheets thereon one after another in piles, a stapling device, a carrier consisting of an endless rack and attached grippers for carrying the so-deposited piles to the stapling device, a shaft geared directly with said endless rack for driving the same, a second shaft geared with the first-mentioned one and furnished with a ratchet-wheel, a pawl-lever fitted to oscillate upon said second shaft and furnished with a pawl engaging with said ratchet-wheel, a continuously-rotating shaft and a cam thereon for operating said pawl-lever for producing an intermittent rotary motion of the ratchet-wheel and its shaft and through it an intermittent motion of the first-mentioned shaft and the endless rack, substantially as herein described.

29. The combination of two tables and means for depositing sheets thereon one after another in piles, stapling devices one for each table, carriers one for each table consisting of endless racks and attached grippers for carrying the so-deposited piles to the stapling devices, a shaft furnished with gears one for driving one and the other for driving the other of said endless-rack carriers, a clutch on said shaft for coupling one of said gears therewith and uncoupling the other therefrom, a lever for operating said clutch, a second shaft geared with the first-mentioned shaft and having fast upon it a ratchet-wheel, a pawl-lever fitted to oscillate upon said second shaft and furnished with a pawl engaging with said ratchet-wheel, two continuously-rotating shafts geared together, a cam on one of said continuously-rotating shafts for operating said clutch-operating lever and a cam on the other of said continuously-rotating shafts for producing an intermittent rotation of said second shaft and through it a corresponding rotation of the first-mentioned shaft and an intermittent movement of each of the endless-rack carriers in turn while the other one is stationary, substantially as herein described.

30. The combination of a table and means for laying sheets thereon in piles, an endless-rack carrier furnished with grippers for carrying the so-laid piles along said table, and a track-cam along which said grippers run to produce their opening for the release of the piles at the proper point in the length of the table, substantially as herein described.

31. The combination with two sheet-receiving tables arranged side by side and two endless carriers, one for each table, furnished with grippers for carrying sheets along said table, of two movable track-cams, one for each carrier, for producing the opening of its grippers by their run along the table, two rotary cams one for each track-cam, connections between said rotary cams and track-cams, and a shaft upon which said rotary cams are so respectively arranged that one of said track-cams is thereby held in position for opening its respective grippers while the other remains out of such operative position, substantially as herein described.

32. The combination with two sheet-receiving tables arranged side by side and two endless carriers, one for each table, furnished with grippers for carrying sheets along said table, of two track-cams consisting of bars arranged one below each carrier, pivotal supports for said bars, two rotary cams one for each of said bars, connections between said rotary cams and bars and a shaft upon which said rotary cams are so relatively arranged that one of said bars is raised by its respective rotary cam to an operative position within the range of the grippers of its respective carrier for opening said grippers while the other of said bars remains out of such operative position with respect to the grippers of its carrier, substantially as herein described.

In testimony that I claim the foregoing as my invention I have signed my name, in presence of two witnesses, this 19th day of May, A. D. 1902.

CHARLES P. COTTRELL.

Witnesses:
A. R. STILLMAN,
THEODORE DOWNS.